United States Patent [19]
Taal

[11] Patent Number: 5,790,593
[45] Date of Patent: Aug. 4, 1998

[54] SYSTEM FOR SETTING UP A WIRELESS CONNECTION FOR EXCHANGING INFORMATION WITH ANOTHER SYSTEM, WHICH SYSTEM IS PROVIDED WITH A TRANSCEIVER DEVICE FOR TRANSMITTING AND RECEIVING INFORMATION IN A WIRELESS MANNER, AND ALSO MODULATOR/DEMODULATOR DEVICE

[75] Inventor: Kees Peter Taal, Ma The Hague, Netherlands

[73] Assignee: Koninklijke PTT Nederland N.V., Netherlands

[21] Appl. No.: 493,267

[22] Filed: Jun. 21, 1995

[30] Foreign Application Priority Data

Jun. 28, 1994 [NL] Netherlands ............... 9401078

[51] Int. Cl.$^6$ ........................................ H04B 1/38
[52] U.S. Cl. ............................................ 375/222
[58] Field of Search ........................ 375/219, 220, 375/222, 224, 260, 299; 455/33.1, 59, 103; 379/58, 59

[56] References Cited

U.S. PATENT DOCUMENTS

| | | |
|---|---|---|
| 4,912,756 | 3/1990 | Hop ........................... 375/216 |
| 4,972,457 | 11/1990 | O'Sullivan ................. 379/59 |
| 5,127,041 | 6/1992 | O'Sullivan ................. 379/59 |
| 5,345,600 | 9/1994 | Davidson ............... 375/260 X |
| 5,479,480 | 12/1995 | Scott ........................ 379/59 |
| 5,513,213 | 4/1996 | Patel et al. ............... 375/222 |

FOREIGN PATENT DOCUMENTS

WO9210047  6/1992  WIPO.

*Primary Examiner*—Stephen Chin
*Assistant Examiner*—Kevin Kim
*Attorney, Agent, or Firm*—Michaelson & Wallace; Peter L. Michaelson

[57] ABSTRACT

A known system having a transceiver device (such as a radiotelephone, or walkie-talkie) for the transmission and reception of speech information via a speech channel in a wireless manner is only able to transmit and receive short data messages via an organization channel, switching means present in the transceiver device determining the channel with which the transceiver device is coupled through. As a result of expanding the system with a modulator/demodulator device, it can transmit and receive large quantities of data via the speech channel, an increased efficiency of the system being obtained by triggering the switching means from the modulator/demodulator device.

34 Claims, 1 Drawing Sheet

FIG. 1

SYSTEM FOR SETTING UP A WIRELESS CONNECTION FOR EXCHANGING INFORMATION WITH ANOTHER SYSTEM, WHICH SYSTEM IS PROVIDED WITH A TRANSCEIVER DEVICE FOR TRANSMITTING AND RECEIVING INFORMATION IN A WIRELESS MANNER, AND ALSO MODULATOR/DEMODULATOR DEVICE

BACKGROUND OF THE INVENTION

The invention relates to a system for setting up a wireless connection for exchanging information with another system, which system is provided with a transceiver device for transmitting and receiving information in a wireless manner, which transceiver device is provided with switching means for coupling the transceiver device through to a first channel in response to a first selection signal and for coupling the transceiver device through to a second channel in response to a second selection signal.

Such a system is generally known and relates, for example, to a radiotelephone provided with a keyboard, microphone and loudspeaker. A call is initiated via the keyboard, for example by keying in the number of the radiotelephone of the party to be called, after which the transceiver device associated with the radiotelephone transmits said call. Said transceiver device is provided with switching means which comprise a transmitter which is switchable to different transmission frequencies and a receiver which is switchable to different reception frequencies. In response to the call initiated via the keyboard, the first selection signal is generated, as a result of which the transmitter is switched over to a first transmission frequency and the receiver to a first reception frequency, with the result that the call is transmitted via the first channel, the so-called organization channel, and a confirmation to be transmitted by the radiotelephone of the party to be called can be received via said first channel. Thereafter, short data messages are transmitted, for example, via the keyboard to the radiotelephone of the called party via the first channel, or a second selection signal is generated, for example, via the keyboard, in response to which the transmitter is switched over to a second transmission frequency and the receiver to a second reception frequency, with the result that speech transmission can take place via the second channel, the so-called speech channel, via the microphone and loudspeaker. Before the generation of the second selection signal takes place, this should, of course, be communicated to the party to be called or called via the first channel, which is preferably done by expanding the call with said information.

Such a system has, inter alia, the disadvantage that only short data messages can be transmitted and received via such a system. In that regard, efficient transmission at any one time of a quantity of data corresponding to a page of the size of the A4 format provided with text is impossible via said known system.

SUMMARY OF THE INVENTION

The object of the invention is, inter alia, to provide a system of the type mentioned in the introduction with which a much larger quantity of data can be efficiently transmitted at any instance.

For this purpose, the system according to the invention has the characteristic that it is provided with a modulator/demodulator device coupled to the transceiver device, which modulator/demodulator device is provided with generating means for generating the first and the second selection signal.

As a result of expanding the radiotelephone with the modulator/demodulator device, or modem, modulated data can be transmitted (at high data rate) via the second channel, the so-called speech channel, the generation of the first and the second selection signal by the modem via the generating means increasing the efficiency because, as soon as data is presented, the modem can either cause the radiotelephone to transmit a call via the first channel or can cause the modulated data to be transmitted by the radiotelephone via the second channel.

The invention is based, inter alia, on the insight that, as a result of using a modem, data can in fact be transmitted at a high data rate in a modulated manner via the second channel (the speech channel) and not via the first channel (organization channel) and that, because the modem is the first to be informed and is the best informed about the state of affairs relating to the transmission of data to be modulated and/or the reception of modulated data, the modem should have control over the radiotelephone by generating the selection signals.

The problem of transmitting data in a radiotelephone system or in a walkie-talkie system in a wireless manner at high efficiency in any instance is therefore solved by coupling a modulator/demodulator device to the transceiver device and allowing the transceiver device to be controlled by the modulator/demodulator device. The generation of the first and the second selection signal by the generating means may take place either directly or in a more indirect manner. In this last case, the generating means generate two other signals which are converted into the two selection signals either in the modulator/demodulator device or in the transceiver device.

A first embodiment of the system according to the invention has the characteristic that the transceiver device is provided with a sound reproduction device which can be switched on in response to a third selection signal and can be switched off in response to a fourth selection signal, the modulator/demodulator device being provided with further generating means for generating the third and the fourth selection signal.

Via the further generating means, the modem obtains control over the loudspeaker associated with the radiotelephone so that the latter can be switched off, for example, during data transmission.

A second embodiment of the system according to the invention has the characteristic that the system is provided with a data terminal, coupled to the modulator/demodulator device, for generating an activating signal for activating the generating means.

Via the data terminal such as, for example, a personal computer provided with a keyboard, data originating from a file can be transmitted to the modem in response to codes generated via the keyboard, one of said codes, for example, activating—as an activating signal—the generating means associated with the modem. As a result, the ultimate initiation of the data transmission resides in the data terminal.

A third embodiment of the system according to the invention has the characteristic that the modulator/demodulator device is provided with first detection means for detecting a speech code associated with the activating signal and, in response to detection of said speech code, for transmitting speech signalling information via the transceiver device and via the first channel, and second detection means for detecting a speech signalling signal to be received via the first channel and via the transceiver device and, in response to detection of said speech signalling signal, for generating the second selection signal for setting up a wireless speech connection via the second channel.

As a result of using the first and second detection means, a speech transmission can be initiated from the data terminal via the second channel (the so-called speech channel), the modem being able to switch on the loudspeaker associated with the radiotelephone by generating the third selection signal.

A fourth embodiment of the system according to the invention has the characteristic that the modulator/demodulator device is provided with third detection means for detecting a data code associated with the activating signal and, in response to detection of said data code, for transmitting data signalling information via the transceiver device and via the first channel, and fourth detection means for detecting a data signalling signal to be received via the first channel and via the transceiver device and, in response to detection of said data signalling signal, for generating the second selection signal for setting up a wireless data connection via the second channel.

As a result of using the third and fourth detection means, a data transfer can be initiated from the data terminal via the second channel (the so-called speech channel), the modem being able to switch off the loudspeaker associated with the radiotelephone by generating the fourth selection signal.

A fifth embodiment of the system according to the invention has the characteristic that the modulator/demodulator device is provided with fifth detection means for detecting a status code associated with the activating signal and, in response to detection of said status code, for transmitting status signalling information via the transceiver device and via the first channel.

As a result of using the fifth detection means, a status signal transmission can be initiated from the data terminal via the first channel (the so-called organization channel), the modem being able to switch off the loudspeaker associated with the radiotelephone by generating the fourth selection signal. Such a status signal is a short code, for example a number, with which, for example, the departure of a vehicle from a certain position or the arrival of said vehicle at another position is indicated, and is preferably transmitted via the first channel (the organization channel) for reasons of efficiency.

A sixth embodiment of the system according to the invention has the characteristic that the modulator/demodulator device is provided with sixth detection means for detecting a speech signalling signal to be received via the first channel and via the transceiver device and, in response to detection of said speech signalling signal, for consecutively transmitting speech signalling information via the transceiver device and via the first channel, and generating the second selection signal for setting up a wireless speech connection via the second channel.

As a result of using the sixth detection means, the modem is capable of responding to an incoming call for speech transmission via the second channel (the speech channel), the modem being able to switch on the loudspeaker associated with the radiotelephone by generating the third selection signal.

A seventh embodiment of the system according to the invention has the characteristic that the modulator/demodulator device is provided with seventh detection means for detecting a data signalling signal to be received via the first channel and via the transceiver device and, in response to detection of said data signalling signal, for consecutively transmitting data signalling information via the transceiver device and via the first channel, and generating the second selection signal for setting up a wireless data connection via the second channel.

As a result of using the seventh detection means, the modem is capable of responding to an incoming call for data transmission via the second channel (the speech channel), the modem being able to switch off the loudspeaker associated with the radiotelephone by generating the fourth selection signal.

An eighth embodiment of the system according to the invention has the characteristic that the modulator/demodulator device is provided with eighth detection means for detecting a status signalling signal to be received via the first channel and via the transceiver device.

As a result of using the eighth detection means, the modem is capable of receiving an incoming status signal via the first channel (the organization channel) the modem being able to switch off the loudspeaker associated with the radiotelephone by generating the fourth selection signal.

The invention also relates to a modulator/demodulator device.

The modulator/demodulator device according to the invention has the characteristic that the modulator/demodulator device is provided with generating means for generating a first and a second selection signal for feeding to a transceiver device which can be coupled to the modulator/demodulator device for setting up a wireless connection for exchanging information with another system by transmitting and receiving information via the transceiver device in a wireless manner, which transceiver device is provided with switching means for coupling, in response to the first selection signal, the transceiver device through to a first channel and for coupling the transceiver device through to a second channel in response to the second selection signal.

A first embodiment of the modulator/demodulator device according to the invention has the characteristic that the modulator/demodulator device is provided with further generating means for generating a third and a fourth selection signal for feeding to the transceiver device which is provided with a sound reproduction device which can be switched on in response to the third selection signal and switched off in response to the fourth selection signal.

A second embodiment of the modulator/demodulator device according to the invention has the characteristic that the modulator/demodulator device is provided with reception means for receiving an activating signal, originating from a data terminal which can be coupled to the modulator/demodulator, for activating the generating means.

A third embodiment of the modulator/demodulator device according to the invention has the characteristic that the modulator/demodulator device is provided with first detection means for detecting a speech code associated with the activating signal and, in response to detection of said speech code, for transmitting speech signalling information via the transceiver device and via the first channel, and second detection means for detecting a speech signalling signal to be received via the first channel and via the transceiver device and, in response to detection of said speech signalling signal, for generating the second selection signal for setting up a wireless speech connection via the second channel.

A fourth embodiment of the modulator/demodulator device according to the invention has the characteristic that the modulator/demodulator device is provided with third detection means for detecting a data code associated with the activating signal and, in response to detection of said data code, for transmitting data signalling information via the transceiver device and via the first channel, and fourth detection means for detecting a data signalling signal to be received via the first channel and via the transceiver device and, in response to detection of said data signalling signal, for generating the second selection signal for setting up a wireless data connection via the second channel.

A fifth embodiment of the modulator/demodulator device according to the invention has the characteristic that the modulator/demodulator device is provided with fifth detection means for detecting a status code associated with the activating signal and, in response to detection of said status code, for transmitting status signalling information via the transceiver device and via the first channel.

A sixth embodiment of the modulator/demodulator device according to the invention has the characteristic that the modulator/demodulator device is provided with sixth detection means for detecting a speech signalling signal to be received via the first channel and via the transceiver device and, in response to detection of said speech signalling signal, for consecutively transmitting speech signalling information via the transceiver device and via the first channel, and generating the second selection signal for setting up a wireless speech connection via the second channel.

A seventh embodiment of the modulator/demodulator device according to the invention has the characteristic that the modulator/demodulator device is provided with seventh detection means for detecting a data signalling signal to be received via the first channel and via the transceiver device and, in response to detection of said data signalling signal, for consecutively transmitting data signalling information via the transceiver device and via the first channel, and generating the second selection signal for setting up a wireless data connection via the second channel.

An eighth embodiment of the modulator/demodulator device according to the invention has the characteristic that the modulator/demodulator device is provided with eighth detection means for detecting a status signalling signal to be received via the first channel and via the transceiver device.

Obviously, various embodiments of the system according to the invention can be mutually combined, and various embodiments of the modulator/demodulator device according to the invention can be mutually combined, and any desired embodiment of the system according to the invention and any desired embodiment of the modulator/demodulator device according to the invention can be combined. All the detection means mentioned could be implemented by using one processor device, a signal to be detected, for example in the form of a certain code, being compared with codes stored in a table memory, which, in the event of equality, implies detection of the particular code. The location of the corresponding code stored in the table memory in that case determines the meaning of the particular code.

BRIEF DESCRIPTION OF THE DRAWING

The invention will be explained in greater detail by reference to an exemplary embodiment shown in the figure. In the figure.

DETAILED DESCRIPTION

Figure 1:
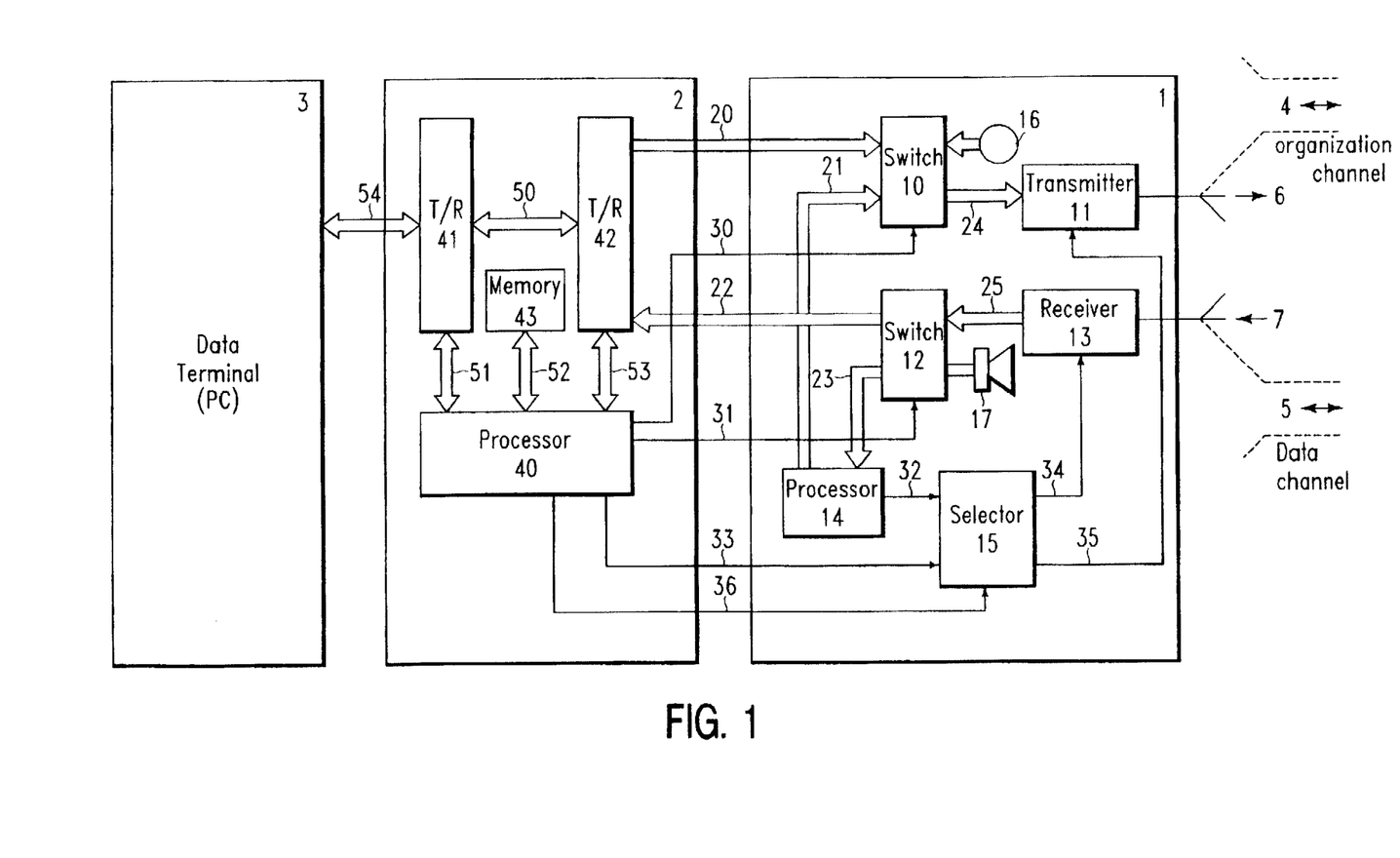
FIG. 1 shows a system according to the invention comprising a modulator/demodulator device according to the invention.

The system according to the invention shown in FIG. 1 is situated, for example, in a motor vehicle and comprises a transceiver device 1, a modulator/demodulator according to the invention, or modem, 2 coupled thereto and a data terminal, or pc, 3 coupled to the latter.

Transceiver device 1 comprises a transmitting aerial 6 and a receiving aerial 7 which are either able to transmit and receive, respectively, via a first channel, or organization channel, 4, or are able to transmit and receive, respectively, via a second channel, or speech channel, 5. For this purpose, the two channels 4 and 5 each comprise two channels situated at a fixed frequency spacing from one another, a so-called outbound channel and a so-called return channel. Transceiver device 1 furthermore comprises a transmitter 11 coupled to the transmitting aerial 6 and a receiver 13 coupled to the receiving aerial 7. Transmitter 11 is coupled via a connection 24 to a first switch 10 for receiving the information to be transmitted and is coupled via a selection connection 35 to selection means 15 for receiving a selection signal. Switch 10 is furthermore coupled to a microphone 16 for receiving speech information, and is coupled via a connection 21 to a processor 14 for receiving control and/or data information, and is coupled via a connection 20 to the modem 2 for receiving control and/or data information, and is coupled via a selection connection 30 to the modem 2 for receiving a selection signal. A receiver 13 is coupled via a connection 25 to a second switch 12 for transmitting to switch 12 information to be received via the receiving aerial 7, and is coupled via a selection connection 34 to selection means 15 for receiving a selection signal. Switch 12 is furthermore coupled to a sound reproduction device, or loudspeaker, 17, and is coupled via a connection 23 to processor 14 for transmitting to the processor 14 control and/or data information, and is coupled via a connection 22 to modem 2 for transmitting to modem 2 control and/or data information, and is coupled via a selection connection 31 to modem 2 for receiving a selection signal. Selection means 15 are furthermore coupled via a selection connection 32 to processor 14 for receiving a selection signal, and are coupled via a selection connection 33 to modem 2 for receiving a selection signal, and are coupled via a control connection 36 to modem 2 for receiving a control signal.

Modem 2 comprises a processor device 40 which is coupled to selection connection 30 for transmitting a selection signal and which is coupled to selection connection 31 for transmitting a selection signal, and which is coupled to selection connection 33 for transmitting a selection signal, and which is coupled to control connection 36 for transmitting a control signal. Modem 2 furthermore comprises first transceiver means 41 which are coupled via a connection 54 to pc 3 and which are coupled via a connection 51 to processor device 40 and which are coupled via a connection 50 to second transceiver means 42. Second transceiver means 42 are furthermore coupled via a connection 53 to processor device 40, and are coupled via connection 20 to transceiver device 1 for transmitting control and/or data information, and are coupled via connection 22 to transceiver device 1 for receiving control and/or data information. Processor device 40 is furthermore coupled via a connection 52 to a memory 43.

The operation of the system shown in FIG. 1 in the case of data communication desired by said system is as follows.

A first start command is transmitted to modem 2 (for example, a so-called Hayes command) from pc 3 via connection 54, which command indicates that data should be transmitted to a certain other system. Said first start command is received by modem 2 via transceiver means 41, the first start command being translated, for example, into another first start command (for example, a so-called MAP 27 command) by communication with processor device 40 via connection 51, after which the translated first start command is fed via connection 50 to transceiver means 42, which pass the translated first start command via connection 20 to switch 10. In the meantime, processor device 40 has been informed via connection 51 of the desire of pc 3 to transmit data, for example by supplying the first start command originating from pc 3. Processor device 40 has also transmitted a control signal to selection means 15 of transceiver device 1 via control connection 36, which has had the result that selection means 15 ignore signals transmitted via selection connection 32 and transmit only signals transmitted via selection connection 33. Processor device 40 has also transmitted via selection connection 33 a first selection signal which is fed via selection means 15 and the respective selection connections 34 and 35 to transmitter 11 and receiver 13, which, in response thereto, are tuned to the outbound channel and the return channel of the organization channel 4. Furthermore, processor device 40 has transmitted via the respective selection connections 30 and 31 the data selection signal to switches 10 and 12, which, in response thereto, have respectively coupled through, on the one hand, connection 20 to connection 24 and, on the other hand, connection 25 to connection 22. Via the respective selection connections 30 and 31, processor device 40 has also, for example, transmitted a fourth selection signal to switches 10 and 12, which has the result that microphone 16 and loudspeaker 17, respectively, are switched off. The translated first start command is transmitted from switch 10 via connection 24 to transmitter 11, which transmits the translated first start command via transmitting aerial 6 and via the outbound channel of the organization channel 4.

Situated at the other end of organization channel 4 is another system, such as, for example, a fixed station, which passes the translated first start command either via a telephone line or via a further wireless connection to another party, which other party then sends back a first start confirmation command which is received by receiver 13 via the return channel of organization channel 4 and receiving aerial 7. Via connection 25, switch 12 and connection 22, said first start confirmation command is transmitted to transceiver means 42 and via connection 53 to processor device 40. In response thereto, processor device 40 transmits via selection connection 33 a second selection signal which is transmitted via selection means 15 and the respective connections 34 and 35 to transmitter 11 and receiver 13, which, in response thereto, are tuned to the go channel and the return channel of speech channel 5. Processor device 40 furthermore informs pc 3 via connection 51, transceiver means 41 and connection 54 of the wireless connection having been set up, after which pc 3 displays this, for example, on a viewing screen and generates data. Said data is sent via connection 54, transceiver means 41, connection 50, transceiver means 42, connection 20, switch 10 and connection 24 to transmitter 11, which transmits the data via transmitting aerial 6 and speech channel 5. During the data transmission, processor device 40 may be able to follow the data transmission via connection 51 in order to be able to detect, for example, a final data unit or to be able to detect the absence of data for some time. Such a detection is also possible from pc 3, in which case the latter should then inform modem 2 via connection 54 at the right instant.

The operation of the system shown in FIG. 1 in the case of speech communication desired by said system from pc 3 is as follows. A second start command is transmitted from pc 3 via connection 54 to modem 2 (for example, a so-called Hayes command) which indicates that speech should be transmitted to a certain other system. Said second start command is received by modem 2 via transceiver means 41, the second start command being translated, for example, into another second start command (for example, a so-called MAP 27 command) by communication via connection 51 with processor device 40, after which the translated second start command is fed via connection 50 to transceiver means 42, which transmits the translated second start command via connection 20 to switch 10. In the meantime, processor device 40 has been informed via connection 51 of the desire of pc 3 to transmit data, for example by supplying the second start command originating from pc 3, and processor device 40 has transmitted a control signal to selection means 15 of transceiver device 1 via control connection 36, which has had the result that selection means 15 ignore signals transmitted via selection connection 32 and transmit only signals transmitted via selection connection 33. Processor device 40 has also transmitted via selection connection 33 a first selection signal which is fed via selection means 15 and the respective selection connections 34 and 35 to transmitter 11 and receiver 13, which, in response thereto have been tuned to the go channel and the return channel of organization channel 4. Furthermore, processor device 40 has transmitted via the respective selection connections 30 and 31 a data selection signal to switches 10 and 12, which, in response thereto, have respectively coupled through, on the one hand, connection 20 to connection 24 and, on the other hand, connection 25 to connection 22. Via the respective selection connections 30 and 31, processor device 40 has, for example, also transmitted a fourth selection signal to switches 10 and 12, which has the result that microphone 16 and loudspeaker 17, respectively, are switched off. The translated second start command is transmitted from switch 10 via connection 24 to transmitter 11, which transmits the translated second start command via transmitting aerial 6 and via the outbound channel of organization channel 4.

Situated at the other end of the organization channel 4 is another system, such as, for example, a fixed station, which sends the translated second start command either via a telephone line or via a further wireless connection to another party, which other party then sends back a second start confirmation command which is received by receiver 13 via the return channel of organization channel 4 and receiving aerial 7. Via connection 25, switch 12 and connection 22, said start confirmation command is transmitted to transceiver means 42 and via connection 53 to processor device 40. In response thereto, processor device 40 transmits via selection connection 33 a second selection signal which is transmitted via selection means 15 and the respective connections 34 and 35 to transmitter 11 and receiver 13, which, in response thereto, are tuned to the outbound channel and the return channel of speech channel 5. Processor device 40 then transmits via the respective selection connections 30 and 31 a speech selection signal to switches 10 and 12, which, in response thereto, mutually isolate, for example, on the one hand, connection 20 and connection 24 and, on the other hand, connection 25 and connection 22, respectively. Via the respective selection connections 30 and 31, processor device 40 also transmits a third selection signal to switches 10 and 12, which has the result that microphone 16 and loudspeaker 17, respectively, are switched on. Furthermore, processor device 40 informs pc 3 via connection 51, transceiver means 41 and connection 54 that wireless connection has been set up, after which pc 3 displays this, for example, on a viewing screen. Via microphone 16, switch 10 and connection 24, the speech information to be transmitted is sent to transmitter 11, which transmits it via transmitting aerial 6 and the outbound channel of speech channel 5, while speech information to be received is fed to loudspeaker 17 via the return channel of speech channel 5, receiving aerial 7, receiver 13, connection 25 and switch 12.

The operation of the system shown in FIG. 1 in the case of speech communication desired by said system from transceiver device 1 is as follows. A control signal is transmitted via control connection 32 to selection means 15 from processor 14 (for example in response to a microphone key signal via a connection, not shown in FIG. 1, between microphone 16 and processor 14), which has the result that the selection means 15 transmit only signals transmitted via selection connection 32 and ignore signals transmitted via selection connection 33. Processor 14 then transmits via selection connection 32 a first selection signal which is fed via the respective selection connections 34 and 35 to transmitter 11 and receiver 13, which, in response thereto, are tuned to the outbound channel and the return channel of organization channel 4. Via connection 21, processor 14 transmits a third start command to switch 10 which indicates that speech should be transmitted to a certain other system. Said third start command is fed via connection 24 to transmitter 11, which transmits the third start command via transmitting aerial 6 and via the outbound channel of organization channel 4. If, therefore, no signals are transmitted to switches 10 and 12 via the respective selection connections 30 and 31, they respectively couple, on the one hand, connection 21 to connection 24 and, on the other hand, connection 25 to connection 23, and microphone 16 and loudspeaker 17 are switched on so that the third start command will be audible, for example, as a set of tones.

Situated at the other end of organization channel 4 is another system, such as, for example, a fixed station, which sends the third start command either via a telephone line or via a further wireless connection to another party, which other party then sends back a third start confirmation command, which is received by receiver 13 via the return channel of organization channel 4 and receiving aerial 7. Via connection 25, switch 12 and connection 23, said start confirmation command is transmitted to processor 14. In response thereto, processor 14 transmits via selection connection 32 a second selection signal which is transmitted via selection means 15 and the respective connections 34 and 35 to transmitter 11 and receiver 13, which, in response thereto, are tuned to the outbound channel and the return channel of speech channel 5. Speech information to be transmitted is then sent via microphone 16, switch 10 and connection 24 to transmitter 11, which transmits it via transmitting aerial 6 and the outbound channel of speech channel 5, while speech information to be received is fed via the return channel of speech channel 5, receiving aerial 7, receiver 13, connection 25 and switch 12 to loudspeaker 17.

The operation of the system shown in FIG. 1 in the case of status communication desired by said system from transceiver device 1 is as follows. A control signal is transmitted from processor 14 via control connection 32 to selection means 15, which has the result that selection means 15 transmit only signals transmitted via selection connection 32 and ignore signals transmitted via selection connection 33. Processor 14 then transmits via selection connection 32 a first selection signal which is fed via the respective selection connections 34 and 35 to transmitter 11 and receiver 13, which, in response thereto, are tuned to the outbound channel and the return channel of organization channel 4. Via connection 21, processor 14 transmits a fourth start command to switch 10, which command indicates that a status signal should be transmitted to a certain other system. Said fourth start command is fed via connection 24 to transmitter 11, which transmits the fourth start command via transmitting aerial 6 and via the outbound channel of organization channel 4. If, therefore, no signals are transmitted to switches 10 and 12 via the respective selection connections 30 and 31, they respectively couple, on the one hand, connection 21 to connection 24 and, on the other hand, connection 25 to connection 23, and microphone 16 and loudspeaker 17 are switched on so that the fourth start command will be audible, for example, as a set of tones.

Situated at the other end of organization channel 4 is another system, such as, for example, a fixed station, which sends the fourth start command either via a telephone line or via a further wireless connection to another party, which other party then sends back a fourth start confirmation command, which is received by receiver 13 via the return channel of organization channel 4 and receiving aerial 7. Via connection 25, switch 12 and connection 23, said start confirmation command is transmitted to processor 14. In response thereto, processor 14 transmits via connection 21, switch 10 and connection 24 a status signal to transmitter 11, which transmits it via transmitting aerial 6 and the outbound channel of organization channel 4, while a status signal to be received is fed via the return channel of organization channel 4, receiving aerial 7, receiver 13, connection 25 and switch 12 to processor 14. Said status signal will also be audible, for example, as a set of tones.

A more efficient system in the case of status communication desired by this system from transceiver device 1 is implemented by incorporating the status signal directly in the fourth start command, in which case reception of the fourth confirmation signal implies that the status signal has already been received and said status signal does not still have to be transmitted.

The operation of the system shown in FIG. 1 in the case of status communication desired by said system from pc 3 is as follows. A fifth start command is transmitted from pc 3 via connection 54 to modem 2 (for example, a so-called Hayes command), which start command indicates that status should be transmitted to a certain other system. Said fifth start command is received by modem 2 via transceiver means 41, the fifth start command being translated into another fifth start command (for example a so-called MAP 27 command) by communication with processor device 40 via connection 51, after which the translated fifth start command is fed via connection 50 to transceiver means 42, which transmit the translated fifth start command via connection 20 to switch 10. In the meantime, processor device 40 has been informed via connection 51 of the desire of pc 3 to transmit a status signal, for example by supplying the fifth start command originating from pc 3. Processor device 40 has also transmitted a control signal to selection means 15 of transceiver device 1 via control connection 36, which has had the result that selection means 15 ignore signals transmitted via selection connection 32 and transmit only signals transmitted via selection connection 33. Processor device 40 has also transmitted via selection connection 33 a first selection signal which is fed via selection means 15 and the respective selection connections 34 and 35 to transmitter 11 and receiver 13, which, in response thereto, have been tuned to the outbound channel and the return channel of organization channel 4. Furthermore, processor device 40 has transmitted via the respective selection connections 30 and 31 a data selection signal to switches 10 and 12, which, in response thereto, have respectively coupled through, on the one hand, connection 20 to connection 24 and, on the other hand, connection 25 to connection 22. Via the respective selection connections 30 and 31, processor device 40 has also transmitted a fourth selection signal to switches 10 and 12, which has the result that microphone 16 and loudspeaker 17 are respectively switched off. The translated fifth start command is transmitted from switch 10 via connection 24 to transmitter 11, which transmits the translated fifth start command via transmitting aerial 6 and via the outbound channel of organization channel 4.

Situated at the other end of organization channel 4 is another system, such as, for example, a fixed station, which sends the translated fifth start command either via a telephone line or via a further wireless connection to another party, which other party then sends back a fifth start confirmation command which is received by receiver 13 via the return channel of organization channel 4 and receiving aerial 7. Via connection 25, switch 12 and connection 22, said start confirmation command is transmitted to transceiver means 42 and via connection 53 to processor device 40. Processor device 40 furthermore informs pc 3 of the wireless connection having been set up via connection 51, transceiver means 41 and connection 54, after which pc 3 displays this, for example, on a viewing screen and generates a status signal. Via connection 54, transceiver means 41, connection 50, transceiver means 42, connection 20, switch 10 and connection 24, the status signal to be transmitted is sent to transmitter 11, which transmits it via transmitting aerial 6 and the outbound channel of organization channel 4, while any status signals to be received are fed to pc 3 via the return channel of organization channel 4, receiving aerial 7, receiver 13, connection 25, switch 12, connection 22, transceiver means 42, connection 50, transceiver means 41 and connection 54.

A more efficient system in the case of status communication desired by said system from pc 3 is implemented by incorporating the status signal directly in the fifth start command, in which case reception of the fifth confirmation signal implies that the status signal has already been received and said status signal does not still have to be transmitted.

The operation of the system shown in FIG. 1 in the case of data communication with said system desired by another system of another party situated at the other end of organization channel 4 is as follows. The other system sends a sixth start command either via a telephone line or via a further wireless connection and then via a fixed station, which start command is received by receiver 13 via the return channel of organization channel 4 and receiving aerial 7. Via connection 25, switch 12 and connection 22, said sixth start command is transmitted to transceiver means 42 and via connection 53 to processor device 40. In the non-operative condition, modem 2 is therefore connected through via connections 20 and 22 to transceiver device 1, and transmitter 11 and receiver 13 are tuned to the outbound channel and the return channel of organization channel 4. In response to the reception of the sixth start command, processor device 40 transmits a control signal via control connection 36 to selection means 15 of transceiver device 1, which has the result that selection means 15 ignore signals transmitted via selection connection 32 and only transmit signals transmitted via selection connection 33. Processor device 40 can also transmit a fourth selection signal to switches 10 and 12 via the respective selection connections 30 and 31, which has the result that microphone 16 and loudspeaker 17 are respectively switched off. Processor device 40 then generates a sixth start confirmation command which is transmitted via connection 20 and switch 10 via connection 24 to transmitter 11, which transmits the sixth start confirmation command via transmitting aerial 6 and via the outbound channel of organization channel 4. Processor device 40 then transmits via selection connection 33 a second selection signal which is transmitted via selection means 15 and the respective connections 34 and 35 to transmitter 11 and receiver 13, which, in response thereto, are tuned to the outbound channel and the return channel of speech channel 5. Processor device 40 furthermore informs pc 3 via connection 51, transceiver means 41 and connection 54 of the wireless connection having been set up, after which pc 3 displays this, for example, on a viewing screen and prepares to receive data from the other system. A call for data transfer originating from another party is therefore automatically answered. The data is transmitted to pc 3 via the return channel of speech channel 5, receiving aerial 7, receiver 13, connection 25, switch 12, connection 22, transceiver means 42, connection 50, transceiver means 40 and connection 54. Processor device 40 may be able to follow the data transmission via connection 51 during the data transmission in order, for example, to be able to detect a final data unit or to be able to detect the absence of data for a certain time. Such a detection is also possible from pc 3, in which case the latter should inform modem 2 via connection 54 at the right instant.

The operation of the system shown in FIG. 1 in the case of speech communication with said system desired by another system of another party situated at the other end of organization channel 4 is as follows. The other system sends a seventh start command either via a telephone line or via a further wireless connection and then via a fixed station, which start command is received by receiver 13 via the return channel of organization channel 4 and receiving aerial 7. Via connection 25, switch 12 and connection 22, said seventh start command is transmitted to transceiver means 42 and via connection 53 to processor device 40. In the non-operative state, modem 2 is thus connected through via connections 20 and 22 to transceiver device 1, and transmitter 11 and receiver 13 are tuned to the outbound channel and the return channel of organization channel 4. In response to the reception of the seventh start command, processor device 40 transmits a control signal to selection means 15 of transceiver device 1 via control connection 36, which has the result that selection means 15 ignore signals transmitted via selection connection 32 and only transmit signals transmitted via selection connection 33. Processor device 40 can also transmit a fourth selection signal to switches 10 and 12 via the respective selection connections 30 and 31, which signal has the result that microphone 16 and loudspeaker 17, respectively, are switched off. Processor device 40 then generates a seventh start confirmation command which is transmitted via connection 20 and switch 10 via connection 24 to transmitter 11, which transmits the seventh start confirmation command via transmitting aerial 6 and via the outbound channel of organization channel 4. Processor device 40 then transmits via selection connection 33 a second selection signal which is transmitted via selection means 15 and the respective connections 34 and 35 to transmitter 11 and receiver 13, which, in response thereto, are tuned to the outbound channel and the return channel of speech channel 5, and processor device 40 transmits a third selection signal via the respective connections 30 and 31 to switches 10 and 12, which selection signal has the result that microphone 16 and loudspeaker 17, respectively, are switched on. Processor device 40 furthermore informs pc 3 via connection 51, transceiver means 41 and connection 54 of the wireless connection having been set up, after which pc 3 displays this, for example, on a viewing screen. Speech can then be transmitted from the other system to loudspeaker 17 via the return channel of speech channel 5, receiving aerial 7, receiver 13, connection 25 and switch 12, and speech can be transmitted from microphone 16 to the other system via switch 10, connection 24, transmitter 11 and transmitting aerial 6 and via the outbound channel of speech channel 5.

Instead of commands only being transmitted by the fixed station to the other party and vice versa, it is, of course, also possible that said fixed station communicates in a completely independent manner with both parties, in which case said fixed station should therefore have an actual information processing function.

In the system shown in FIG. 1, transmitter 11, receiver 13 and selection means 15 form the switching means for coupling transceiver device 1 through to the first channel 4 in response to the first selection signal and for coupling transceiver device 1 through to the second channel in response to the second selection signal. Processor device 40 then forms the generation means for generating the first and the second selection signals and the further generation means for generating the third and fourth selection signal. PC 3 forms the data terminal for generating an activating signal (for example, the first and second start command) for activating said generating means. Processor device 40 also forms the first detection means for detecting a speech code associated with the activating signal (the second start command) and, in response to detection of said speech code, for transmitting speech signalling information (the translated second start command) via transceiver device 1 and via first channel 4, and the second detection means for detecting a speech signalling signal (the second start confirmation command) to be received via first channel 4 and via transceiver device 1 and, in response to detection of said speech signalling signal, for generating the second selection signal for setting up a wireless speech connection via second channel 5, and the third detection means for detecting a data code associated with the activating signal (the first start command) and, in response to detection of said data code, for transmitting data signalling information (the translated first start command) via transceiver device 1 and via first channel 4, and the fourth detection means for detecting a data signalling signal (the first start confirmation command) to be received via first channel 4 and via transceiver device 1 and, in response to detection of said data signalling signal, for generating the second selection signal for setting up a wireless data connection via second channel 5, and the fifth detection means for detecting a status code associated with the activating signal (the fifth start command) and, in response to detection of said status code, for transmitting status signalling information (the translated fifth start command) via transceiver device 1 and via first channel 4, and the sixth detection means for detecting a speech signalling signal (the seventh start command) to be received via first channel 4 and via transceiver device 1 and, in response to detection of said speech signalling signal, for consecutively transmitting speech signalling information (the seventh start confirmation command) via transceiver device 1 and via first channel 4, and generating the second selection signal for setting up a wireless speech connection via second channel 5, and the seventh detection means for detecting a data signalling signal (the sixth start command) to be received via first channel 4 and via transceiver device 1 and, in response to detection of said data signalling signal, for consecutively transmitting data signalling information (the sixth start confirmation command) via transceiver device 1 and via first channel 4, and generating the second selection signal for setting up a wireless data connection via second channel 5, and the eighth detection means for detecting a status signalling signal (an eighth start command) to be received via first channel 4 and via transceiver device 1.

The first, second and fifth start commands originating from pc 3 (often so-called Hayes commands) are translated in a manner known to the person skilled in the art, for example via memory 43, in which, for example, a table containing corresponding commands (for example, so-called MAP 27 commands) is stored and/or in which sections of software are stored for converting the commands into translated commands. As a result of this extension of modem 2, pc 3 and transceiver device 1 can each communicate in their own language. If communication is to be carried out via the channels 4 and 5 in accordance with a certain protocol (for example, in accordance with the so-called MPT 1327 protocol), a further translation and/or conversion should take place in the transceiver device 1, which translation and/or conversion should be implemented in switches 10 and 12 and/or processor 14 and processor device 40 in a manner known to the person skilled in the art.

The data to be transmitted to and from via speech channel 5 could be transmitted either by the FFSK modulation technique or by the FSK modulation technique, the first offering a better overall result if communication is solely by radio means, while the second offers a better overall result if communication is both by radio means and by telephone lines. There are furthermore various types of speech channel 5, normal speech channels in which regular maintenance messages are concomitantly transmitted and more expensive, advanced speech channels, in which the maintenance messages are removed. As a result, the data can be transmitted with higher efficiency via said advanced speech channels, but supplementary measures have to be taken in the system to compensate for the absence of said maintenance messages which, normally speaking, are used, inter alia, to monitor the channel concerned. The termination of a wireless connection for the transmission of data via an advanced channel in which maintenance messages are absent could be indicated, for example, by including a certain final data command in the data or by automatically terminating the connection after the lapse of a certain time interval after the transmission of the final data. As a result of using so-called dummy messages, a wireless connection can then be maintained without data actually being transmitted. Termination of a wireless connection is also generally possible by generating and transmitting an end command from one end and optionally by generating and transmitting an end confirmation command from the other end.

To promote the user-friendliness, modem 2 should be designed on the basis of various mode options, which mode options should, for example, be set manually. In the case of a first mode option, for example, only speech transmission desired from a pc is possible, in the case of a second mode option, for example, only speech transmission desired from a transceiver device is possible, in the case of a third mode option, for example, only data transmission via an organization channel desired from a pc is possible, in the case of a fourth mode option, for example, only data transmission via a speech transmission desired from a pc is possible, in the case of a fifth mode option, for example, only data transmission via an organization channel desired from a transceiver device is possible, in the case of a sixth mode option, for example, any desired speech transmission is possible, in the case of a seventh mode option, for example, any desired data transmission is possible, in the case of an eighth mode option, for example, any desired speech and data transmission is possible, and for each mode option it may be possible to set whether and when the microphone and/or loudspeaker are switched on and/or off, and whether and when a call for data and/or speech transmission is automatically answered. Because costs are incurred as soon as a wireless connection is set up, an automatic answering of a call for speech transmission results in incurred costs, even if the individual called is not himself present. Said incurred costs could, for example, be avoided by transmitting an earlier start command prior to a start command for initiating a speech transmission, which earlier start command switches on the loudspeaker and indicates that the subsequent start command for initiating a speech transmission does not have to be answered automatically (in other words, only the bell signal may be generated at the receiving end until an individual at the receiving end performs an operation).

The system shown in FIG. 1 could, for example, be expanded with a buffer, situated in modem 2, for temporarily storing data originating from pc 3 and intended for pc 3. In that case, pc 3 can already transmit data at an instant when the connection has not yet been set up and the connection can already be interrupted as soon as all the data has been transmitted to the system, while not all the data has been processed by pc 3 yet. Furthermore, it is possible to monitor at the same time via processor 40 whether the buffer is in danger of being filled with data originating from pc 3 so that the data flow can be temporarily stopped in time by a command to be transmitted from processor device 40 to pc 3. Transceiver means 42 and/or switches 10 and 12 could also be provided with a buffer for temporarily storing data to be mutually exchanged. For the sake of simplicity, the modulation and demodulation which takes place in modem 2 and the optional scrambling and descrambling are not shown separately in FIG. 1. In all cases, these involve techniques which can be implemented in a manner known to the person skilled in the art. Furthermore, modem 2 could be provided with a so-called fork circuit, as a result of which the two connections 20 and 22 can be replaced by one connection. In that case, transceiver device 1 should also be provided with a fork circuit and switches 10 and 12 could be replaced by one advanced switch. Of course, the use of one advanced switch could also be possible without using a fork circuit. In transceiver device 1, the two aerials 6 and 7 can be replaced by one aerial as a result of using a further fork circuit.

Obviously, start commands and start confirmation commands should comprise both an identification of one system and an identification of the other system, and the generation of start commands is, of course, initiated by a human operation, for example by a keyboard coupled to pc 3 or by operating buttons and/or operating keys coupled to processor 14. Furthermore, processor device 40 controls the two transceiver means 41 and 42 and memory 43 in a manner known to the person skilled in the art.

In a manner similar to that described above, it is possible to continuously switch microphone 16 and/or loudspeaker 17 on and off with separate commands originating from pc 3 or processor 14.

I claim:

1. A system for setting up a wireless connection for exchanging information with another system, said system comprising a transceiver device for transmitting and receiving information in a wireless manner, the transceiver device having switching means for coupling the transceiver device to an organization channel in response to a first selection signal and for coupling the transceiver device to a speech channel in response to a second selection signal, the organization and speech channels being separate communication channels, wherein the system further comprises a modulator/demodulator device coupled to the transceiver device, the modulator/demodulator device having generating means for generating the first and second selection signals, and wherein the transceiver device comprises a sound reproduction device which can be switched on in response to a third selection signal and can be switched off in response to a fourth selection signal, the modulator/demodulator device comprising further generating means for generating the third and fourth selection signals.

2. The system according to claim 1, wherein the system further comprises a data terminal coupled to the modulator/demodulator device, the data terminal generating an activating signal to the modulator/demodulator device so as to cause the generating means to generate the first and second selection signals.

3. The system according to claim 2, wherein the modulator/demodulator device comprises:

first detection means for detecting a speech code associated with the activating signal and, in response to detection of said speech code, for transmitting speech signaling information via the transceiver device and via the organization channel; and second detection means for detecting a speech signaling signal to be received via the organization channel and via the transceiver device and, in response to detection of said speech signaling signal, for generating the second selection signal for setting up a wireless speech connection via the speech channel.

4. The system according to claim 2, wherein the modulator/demodulator device further comprises:

third detection means for detecting a data code associated with the activating signal and, in response to detection of said data code, for transmitting data signaling information via the transceiver device and via the organization channel; and fourth detection means for detecting a data signaling signal to be received via the organization channel and via the transceiver device and, in response to detection of said data signaling signal, for generating the second selection signal for setting up a wireless data connection via the speech channel.

5. The system according to claim 2, wherein the modulator/demodulator device further comprises fifth detection means for detecting a status code associated with the activating signal and, in response to detection of said status code, for transmitting status signaling information via the transceiver device and via the organization channel.

6. The system according to claim 2, wherein the modulator/demodulator device further comprises sixth detection means for detecting a speech signaling signal to be received via the organization channel and via the transceiver device and, in response to detection of said speech signaling signal, for consecutively transmitting speech signaling information via the transceiver device and via the organization channel, and generating the second selection signal for setting up a wireless speech connection via the speech channel.

7. The system according to claim 2, wherein the modulator/demodulator device further comprises seventh detection means for detecting a data signaling signal to be received via the organization channel and via the transceiver device and, in response to detection of said data signaling signal, for consecutively transmitting data signaling information via the transceiver device and via the organization channel, and generating the second selection signal for setting up a wireless data connection via the speech channel.

8. The system according to claim 2, wherein the modulator/demodulator device further comprises eighth detection means for detecting a status signaling signal to be received via the organization channel and via the transceiver device.

9. A system for setting up a wireless connection for exchanging information with another system, said system comprising a transceiver device for transmitting and receiving information in a wireless manner, the transceiver device having switching means for coupling the transceiver device to an organization channel in response to a first selection signal and for coupling the transceiver device to a speech channel in response to a second selection signal, the organization and speech channels being separate communication channels, wherein the system further comprises a modulator/demodulator device coupled to the transceiver device, the modulator/demodulator device having generating means for generating the first and second selection signals, and wherein the system further comprises a data terminal coupled to the modulator/demodulator device, the data terminal generating an activating signal to the modulator/demodulator device so as to cause the generating means to generate the first and second selection signals.

10. The system according to claim 9, wherein the modulator/demodulator device comprises:
   first detection means for detecting a speech code associated with the activating signal and, in response to detection of said speech code, for transmitting speech signaling information via the transceiver device and via the organization channel; and
   second detection means for detecting a speech signaling signal to be received via the organization channel and via the transceiver device and, in response to detection of said speech signaling signal, for generating the second selection signal for setting up a wireless speech connection via the speech channel.

11. The system according to claim 9, wherein the modulator/demodulator device further comprises:
   third detection means for detecting a data code associated with the activating signal and, in response to detection of said data code, for transmitting data signaling information via the transceiver device and via the organization channel; and
   fourth detection means for detecting a data signaling signal to be received via the organization channel and via the transceiver device and, in response to detection of said data signaling signal, for generating the second selection signal for setting up a wireless data connection via the speech channel.

12. The system according to claim 9, wherein the modulator/demodulator device further comprises fifth detection means for detecting a status code associated with the activating signal and, in response to detection of said status code, for transmitting status signaling information via the transceiver device and via the organization channel.

13. The system according to claim 9, wherein the modulator/demodulator device further comprises sixth detection means for detecting a speech signaling signal to be received via the organization channel and via the transceiver device and, in response to detection of said speech signaling signal, for consecutively transmitting speech signaling information via the transceiver device and via the organization channel, and generating the second selection signal for setting up a wireless speech connection via the speech channel.

14. The system according to claim 9, wherein the modulator/demodulator device further comprises seventh detection means for detecting a data signaling signal to be received via the organization channel and via the transceiver device and, in response to detection of said data signaling signal, for consecutively transmitting data signaling information via the transceiver device and via the organization channel, and generating the second selection signal for setting up a wireless data connection via the speech channel.

15. The system according to claim 9, wherein the modulator/demodulator device further comprises eighth detection means for detecting a status signaling signal to be received via the organization channel and via the transceiver device.

16. A modulator/demodulator device comprising generating means for generating first and second selection signals to a transceiver device, the transceiver device being coupled to the modulator/demodulator device, for setting up a wireless connection for exchanging information with a system by transmitting and receiving information via the transceiver device in a wireless manner, the transceiver device having switching means for coupling, in response to the first selection signal, the transceiver device to an organization channel and for coupling, in response to a second signal, the transceiver device to a speech channel, the organization and speech channels being separate communication channels, wherein the modulator/demodulator device further comprises further generating means for generating third and fourth selection signals to the transceiver device, the transceiver device also having a sound reproduction device which can be switched on in response to the third selection signal and can be switched off in response to the fourth selection signal.

17. The modulator/demodulator device according to claim 16, wherein the modulator/demodulator device further comprises receiving means for receiving an activating signal, originating from a data terminal coupled to the modulator/demodulator device so as to cause the generating means to generate the first and second selection signals.

18. The modulator/demodulator device according to claim 17, wherein the modulator/demodulator device further comprises:
   first detection means for detecting a speech code associated with the activating signal and, in response to detection of said speech code, for transmitting speech signaling information via the transceiver device and via the organization channel; and
   second detection means for detecting a speech signaling signal to be received via the organization channel and via the transceiver device and, in response to detection of said speech signaling signal, for generating the second selection signal in order to set up a wireless speech connection via the speech channel.

19. The modulator/demodulator device according to claim 17, wherein the modulator/demodulator device further comprises:
- third detection means for detecting a data code associated with the activating signal and, in response to detection of said data code, for transmitting data signaling information via the transceiver device and via the organization channel; and
- fourth detection means for detecting a data signaling signal to be received via the organization channel and via the transceiver device and, in response to detection of said data signaling signal, for generating the second selection signal for setting up a wireless data connection via the speech channel.

20. The modulator/demodulator device according to claim 17, wherein the modulator/demodulator device further comprises fifth detection means for detecting a status code associated with the activating signal and, in response to detection of said status code, for transmitting status signaling information via the transceiver device and via the organization channel.

21. The modulator/demodulator device according to claim 17, wherein the modulator/demodulator device further comprises sixth detection means for detecting a speech signaling signal to be received via the organization channel and via the transceiver device and, in response to detection of said speech signaling signal, for consecutively transmitting speech signaling information via the transceiver device and via the organization channel, and generating the second selection signal for setting up a wireless speech connection via the speech channel.

22. The modulator/demodulator device according to claim 17, wherein the modulator/demodulator device further comprises seventh detection means for detecting a data signaling signal to be received via the organization channel and via the transceiver device and, in response to detection of said data signaling signal, for consecutively transmitting data signaling information via the transceiver device and via the organization channel, and generating the second selection signal for setting up a wireless data connection via the speech channel.

23. The modulator/demodulator device according to claim 17, wherein the modulator/demodulator device further comprises eighth detection means for detecting a status signaling signal to be received via the organization channel and via the transceiver device.

24. A system for setting up a wireless connection for exchanging information with another system, said system comprising a transceiver device for transmitting and receiving information in a wireless manner, the transceiver device having switching means for coupling the transceiver device to an organization channel in response to a first selection signal and for coupling the transceiver device to a speech channel in response to a second selection signal, the organization and speech channels being separate communication channels, wherein the system further comprises a modulator/demodulator device coupled to the transceiver device, the modulator/demodulator device having generating means for generating the first and second selection signals, and wherein the modulator/demodulator device further comprises receiving means for receiving an activating signal, originating from a data terminal coupled to the modulator/demodulator device, so as to cause the generating means to generate the first and second selection signals.

25. The modulator/demodulator device according to claim 24, wherein the modulator/demodulator device further comprises:
- first detection means for detecting a speech code associated with the activating signal and, in response to detection of said speech code, for transmitting speech signaling information via the transceiver device and via the organization channel; and
- second detection means for detecting a speech signaling signal to be received via the organization channel and via the transceiver device and, in response to detection of said speech signaling signal, for generating the second selection signal in order to set up a wireless speech connection via the speech channel.

26. The modulator/demodulator device according to claim 24, wherein the modulator/demodulator device further comprises:
- third detection means for detecting a data code associated with the activating signal and, in response to detection of said data code, for transmitting data signaling information via the transceiver device and via the organization channel; and
- fourth detection means for detecting a data signaling signal to be received via the organization channel and via the transceiver device and, in response to detection of said data signaling signal, for generating the second selection signal for setting up a wireless data connection via the speech channel.

27. The modulator/demodulator device according to claim 24, wherein the modulator/demodulator device further comprises fifth detection means for detecting a status code associated with the activating signal and, in response to detection of said status code, for transmitting status signaling information via the transceiver device and via the organization channel.

28. The modulator/demodulator device according to claim 24, wherein the modulator/demodulator device further comprises sixth detection means for detecting a speech signaling signal to be received via the organization channel and via the transceiver device and, in response to detection of said speech signaling signal, for consecutively transmitting speech signaling information via the transceiver device and via the organization channel, and generating the second selection signal for setting up a wireless speech connection via the speech channel.

29. The modulator/demodulator device according to claim 24, wherein the modulator/demodulator device further comprises seventh detection means for detecting a data signaling signal to be received via the organization channel and via the transceiver device and, in response to detection of said data signaling signal, for consecutively transmitting data signaling information via the transceiver device and via the organization channel, and generating the second selection signal for setting up a wireless data connection via the speech channel.

30. The modulator/demodulator device according to claim 24, wherein the modulator/demodulator device further comprises eighth detection means for detecting a status signaling signal to be received via the organization channel and via the transceiver device.

31. A system for setting up a wireless connection for exchanging information with another system, said system comprising a transceiver device for transmitting and receiving information in a wireless manner, the transceiver device comprising switching means for coupling the transceiver device to a first channel in response to a first selection signal and for coupling the transceiver device to a second channel in response to a second selection signal, wherein the system further comprises a modulator/demodulator device coupled to the transceiver device, the modulator/demodulator device having generating means for generating the first and the second selection signals, wherein the transceiver device further comprises a sound reproduction device which can be switched on in response to a third selection signal and can be switched off in response to a fourth selection signal, the modulator/demodulator device further comprising further generating means for generating the third and the fourth selection signals.

32. A modulator/demodulator device comprising generating means for generating first and second selection signals to a transceiver device, the transceiver device being coupled to the modulator/demodulator device, for setting up a wireless connection for exchanging information with a system by transmitting and receiving information via the transceiver device in a wireless manner, the transceiver device having switching means for coupling, in response to the first selection signal, the transceiver device to a first channel and for coupling, in response to the second selection signal, the transceiver device to a second channel, wherein the modulator/demodulator device further comprises further generating means for generating third and fourth selection signals for feeding to the transceiver device, the transceiver device having a sound reproduction device which can be switched on in response to the third selection signal and can be switched off in response to the fourth selection signal.

33. A system for setting up a wireless connection for exchanging information with another system, said system comprising a transceiver device for transmitting and receiving information in a wireless manner, the transceiver device having switching means for coupling the transceiver device to a first channel in response to a first selection signal and for coupling the transceiver device to a second channel in response to a second selection signal, said system further comprising a modulator/demodulator device coupled to the transceiver device, the modulator/demodulator device having generating means for generating the first and the second selection signals, wherein the system further comprises a data terminal, coupled to the modulator/demodulator device, for generating an activating signal to the modulator/demodulator so as to activate the generating means to generate the first and second selection signals.

34. A modulator/demodulator device comprising generating means for generating first and second selection signals to a transceiver device, the transceiver device being coupled to the modulator/demodulator device, for setting up a wireless connection for exchanging information with a system by transmitting and receiving information via the transceiver device in a wireless manner, the transceiver device having switching means for coupling, in response to the first selection signal, the transceiver device to a first channel and for coupling, in response to the second selection signal, the transceiver device to a second channel, wherein the modulator/demodulator device further comprises receiving means for receiving an activating signal, originating from a data terminal coupled to the modulator/demodulator, so as to activate the generating means to generate the first and second selection signals.

* * * * *